United States Patent [19]
Chin

[11] 3,879,862
[45] Apr. 29, 1975

[54] MINIATURE PLANETARIUM
[76] Inventor: Chang Kon Chin, 204 Avondale Dr., Augusta, Ga. 30907
[22] Filed: Aug. 23, 1973
[21] Appl. No.: 390,820

[52] U.S. Cl. ................................................. 35/45
[51] Int. Cl. ............................................ G09b 27/02
[58] Field of Search ........................ 35/45, 42.5, 47

[56] References Cited
UNITED STATES PATENTS

| | | | |
|---|---|---|---|
| 423,036 | 3/1890 | Dooley | 35/45 |
| 1,838,942 | 12/1931 | Heid | 35/45 |
| 2,399,365 | 4/1946 | Link | 35/47 |
| 3,520,073 | 7/1970 | Baader | 35/45 |

*Primary Examiner*—Wm. H. Grieb
*Attorney, Agent, or Firm*—Browne, Beveridge, DeGrandi & Kline

[57] ABSTRACT

An automatic, miniature planetarium in which a hollow transparent sphere, on which the celestial bodies are portrayed, contains a replica of the sun at the center and a replica of the earth is mounted on a rotating arm to one side of the sun with gear trains connecting to the arm and to the earth in a manner to rotate the earth replica about its axis while the arm carrying the earth rotates about the center of the sphere, a moon replica and support being connected to the gear train for rotation of the moon and support arm about the earth replica.

2 Claims, 3 Drawing Figures

MINIATURE PLANETARIUM

The invention of this application relates to an automatic, miniature planetarium that provides a three-dimensionall, mechanized replica of the universe indicating the movement of the earth and moon around the sun with relationship to the various celestial bodies during the various seasons of the year. It is an automatic, miniature astronomical observatory designed to illustrate the position of the earth, moon and sun during day and night of the year through spring, summer, autumn, winter; during full moon, conjunction of the moon, waxing moon, waning moon; the phenomena of the eclipse of the sun, eclipse of the moon; represent the different length of days in the northern and southern hemisphere; and illustrate the position of the earth and moon relative to the stars, planets and the constellations during the various days and months of the year.

The primary object of the invention is to provide a miniature, automatic representation of the earth, moon, sun, celestial bodies and their relative movements and relationships during the various days and months of the year.

A further object of the invention is to provide a scientific teaching aid that will permit observation of the movement of the earth and moon about the sun at the various seasons and indicate a relationship to the various celestial bodies to each other.

The object of this invention has been attained by mounting within a hollow, transparent sphere, on which representations of the celestial bodies are imposed, a lighted replica of the sun substantially at the center of the sphere and mounting a replica of the earth on an arm supported from the base on which the sphere is mounted and rotating the arm about the central axis of the sphere. Gear trains driven by the rotation of the arm and supported from the arm rotate the earth about its axis that is supported by a plate which is also rotated relative to the moving arm. A replica of the moon and a support arm are also connected to the gear train for rotation of the moon about the rotating earth. A calendar plate at the periphery of the rotating arm provides an indication of the position of the various bodies during the various seasons of the year.

Reference is now made to the following description of the invention that is taken in connection with the accompanying drawings in which.

Figure 1:
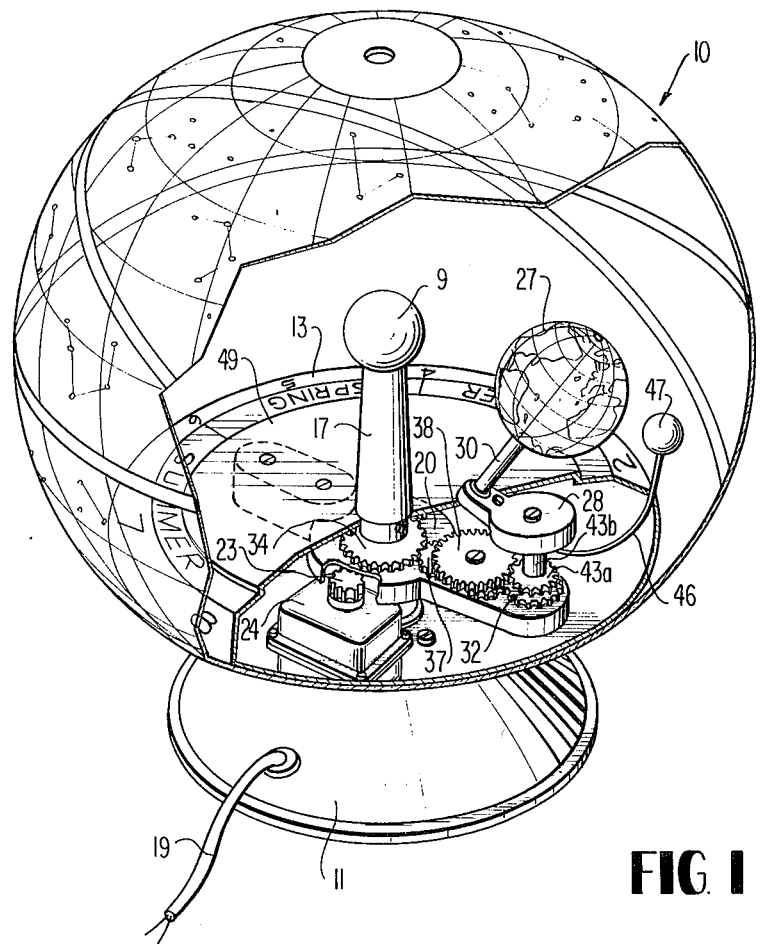
FIG. 1 is a perspective view of the invention with a portion cut away.
Figure 2:
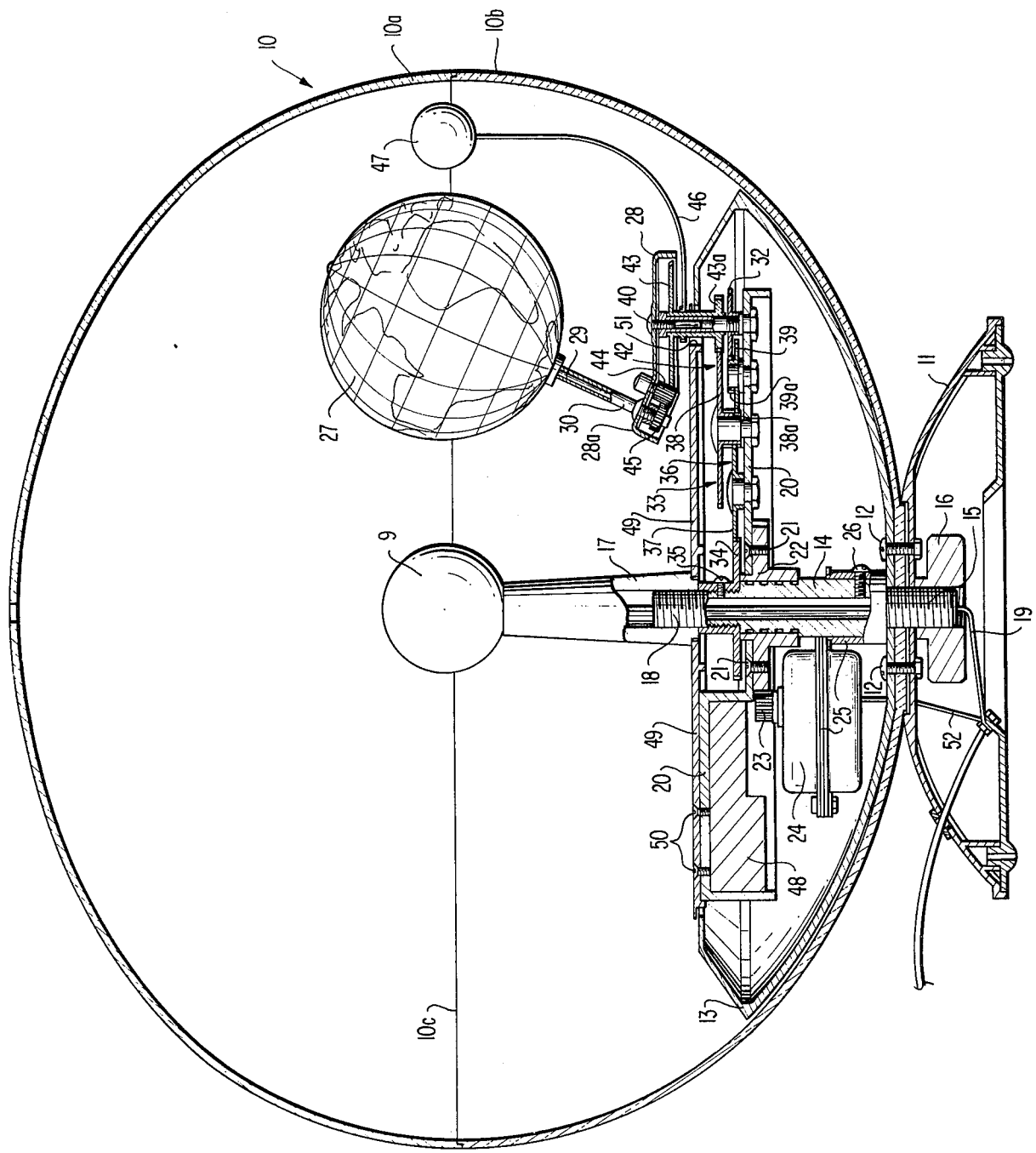
FIG. 2 is a side elevation in section with portions cut away to show the details of the gear trains.

As best seen in FIG. 2, a hollow, transparent sphere 10, which is somewhat elliptical in cross-sectional shape, is affixed to a supporting base 11 by means of the bolts 12 which also affix the calendar base within the lower portion of the sphere 10. As may be noted in FIG. 1, the various seasons and months of the year are indicated around the periphery of the calendar base 13. A center post 14, having a threaded lower portion 15, is affixed to the supporting base 11 by means of the nut 16 to extend upwardly into the interior of the sphere along its central axis. A socket base 17 extends from an upper threaded portion 18 upwardly into the central portion of the sphere and a small light bulb 9, representing the sun, is screwed into the upper portion of the socket base 17 at the center of the sphere. The center post 14, as well as the socket base 17, are hollow along their length with an insulated electric wire cord 19 extending from the base through the center post 14 and socket base 17 to the electric bulb 9 which is illuminated when electric power is supplied. The sphere 10 is conveniently made in the form of upper and lower sections 10a and 10b which are fitted together along the joint 10c extending around the horizontal, center periphery of the sphere. As indicated on FIG. 1 representations of the celestial bodies and the constellations are imprinted on the transparent sphere 10, as well as the ecliptic, the celestial equator and such other celestial representations as may be desired, such as the points of the summer and winter solstice and the vernal and autumnal equinox, etc.

A primary support arm 20 that extends around and radially beyond the center post 14 is mounted by screws 21 on a central spur drive gear 22 that is mounted for rotation about the center post 14. The drive gear 22 meshes with the drive pinion 23 of a motor 24 which is supported by a mounting sleeve 25 which is secured to the center post 14 by the screw 26. The support arm 20 is rotated about the center post 14 by the action of the motor drive pinion 23 driving the drive gear 22 affixed to the support arm.

A replica of the earth 27 is supported at one end 28a of a wing plate 28 by the shaft 29 that extends through the earth on its north-south axis and is rotatably contained within a support pipe 30 that is affixed to the wing plate end portion 28a. The wing plate 28 is supported on an outer end of the support arm 20 for rotation with respect to the support arm about a vertical axis R by an upper extension 31 of a spur gear 32 which is a portion of a gear train 33 that extends from the spur gear 32 and the wing plate 28 on the primary support arm to a fixed gear 34 that is threaded onto the upper portion of the center post 14 and locked to the center post by the locking screw 35. The outer portion 28a of the wing plate 28, carrying the support pipe 30, is inclined with respect to the vertical axis of the sphere such that the axis of the earth replica is tilted at an angle of approximately 23½ with respect to the vertical center line of the center post 14, representing the inclination of the earth's equator to the celestial equator.

Figure 3:
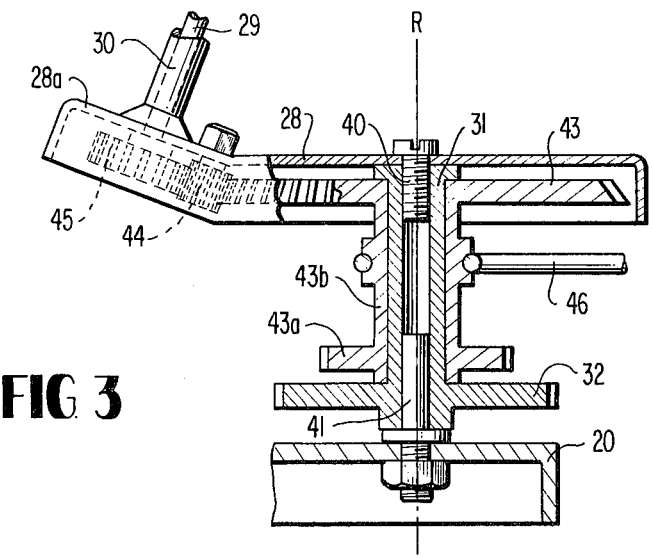
FIG. 3 is a side elevation, partially cut away, of a portion of the structure that supports the replica of the earth.

The gear train 33, meshing with the fixed gear 34 is supported on the primary support arm 20 and is driven by the rotation of the support arm around the periphery of the fixed gear 34. The gear train 33 has two portions, the first train 36 comprising a set of meshing gears directly supported on the support arm 20 and rotating the wing plate 28 about its rotational axis R, relative to the support arm. The gears of the first train comprise the spur gear 37 rotatably mounted on the inner portion of the support arm 20 to mesh with the teeth of the fixed gear 34, the spur gear 37 meshing with the teeth of the pinion 38a forming the lower, central portion of the spur gear 38 that is rotatably mounted on the support arm 20 outboard of the spur gear 37, the teeth of the pinion 38a meshing with the teeth of the next spur 39 rotatably mounted on the support arm and having an integral pinion 39a which meshes with the teeth of the spur gear 32 that is rotatably mounted on the outboard portion of the support arm 20 concentric with the rotational axis R of the wing plate 28. As can best be seen in FIG. 3, the spur gear 32 has an upwardly extending extension 31 that is affixed to the wing plate 28 by the screw 40, whereupon rotation of the spur gear 32 about its supporting pin 41 rotates the entire wing plate 28 with the attached earth replica 27 about the rotational axis R that is coincident with the support pin 41.

The second train of gears 42 rotate the earth replica about its axis and comprises the spur gear 38, affixed to the pinion 38a driven by the spur gear 37 of the first train, that meshes with a pinion 43a of a double gear having a body portion 43b concentrically supported by the support arm 20 for rotation about the extension 31 of the spur gear 32. On the upper portion of the gear body 43b a spur gear 43 meshes with the idler gear 44 rotatably mounted on the wing plate 28 which in turn meshes with the gear 45 affixed to the lower end of the shaft 29 supporting the earth replica and mounted for rotation within the support pipe 30.

One end of a supporting wire 46 is affixed to the middle portion of the body 43b of the gear 43 and pinion 43a. The support wire 46 extends outwardly to clear the wing plate 28 and then is curved upwardly with a replica of the moon 47 affixed to the upper end of the support wire in a position spaced from the earth and substantially on a line extending through the center of the sun replica and the earth replica. A counterweight 48 is affixed to the primary support arm 20 on the side opposite that on which the wing plate 28 with the earth replica 27 and the gear train 33 are mounted. A circular cover plate 49 is affixed to and overlies the primary support arm 20 by the screws 50 with the perimeter of the cover plate being closely adjacent to the inner perimeter of the annular calendar base 13, the cover plate 49 having a small cut out area 51 through which the body 43b and extension 31 of the gear train extend that support the wing plate 28 above the upper surface of the cover plate 49.

Upon supplying power to the motor 24 through the electrical connection 52, which may be conveniently connected into the electric light cord 19, rotation of the motor and its drive pinion 23 meshing with the primary support arm drive gear 22, causes the support arm 20 to rotate about the vertical center line of the center post 14 within the sphere carrying with it the earth replica 27 on its supporting wing plate 28 and the moon replica 47. As the support arm 20 rotates about the center post 14, the gears of the gear train 33 are driven by the relative motion with respect to the fixed gear 34 mounted on the centenr post 14, the first train 36 rotating the wing plate 28 about its rotational axis R relative to the support arm 20 and carrying the tilted earth replica with it, the gears of the second train 42 rotating the earth replica 27 about its north-south axis on the supporting shaft 29 relative to the wing plate 28 and also causing the moon replica 27 and its supporting wire 46 to rotate about the wing plate 28 and the earth replica 27. The resultant motion from the rotation of the wing plate 28 carried by the primary support arm 20 about the center post 14, the rotation of the wing plate 28 about its rotational axis R relative to the primary support arm 20, the rotation of the earth replica about its north-south axis on the support shaft 29 relative to the wing plate 28 and the rotation of the moon replica 47 on its supporting wire 46 relative to the wing plate 28 and the earth replica 27 establishes a three dimensional representation of the relative positions of the earth and the moon as they rotate about the sun with respect to the various celestial bodies during the different seasons of the year, which are indicated around the perimeter of the calendar base 13. In order to establish the correct movement and the position of the earth and moon relative to the sun and the celestial bodies, such that the north-south axis of the earth remains substantially in line with the North Star on the celestial sphere 10, the various gears heretofore described are produced in the relative sizes indicated below so that the gear ratios will provide the desired relative movement of the items that are driven by the gears, the following diameters being non-dimensional and indicating only the diameter ratios of the various gears:

| GEAR OR PINION REFERENCE NO. | DIAMETER |
| --- | --- |
| 23 | 10 |
| 22 | 60 |
| 34 | 48 |
| 37 | 32 |
| 38a | 12 |
| 38 | 54 |
| 39a | 12 |
| 39 | 24 |
| 32 | 24 |
| 43a | 18 |
| 43 | 42 |
| 44 | 7 |
| 45 | 9 |

The foregoing disclosure relates to a perferred embodiment of the invention and numerous modifications and alterations may be made therein without departing from the spirit and scope of the invention as set forth in the appended claims.

I claim:
1. A miniature planetarium comprising:
  1. a base supporting a transparent hollow sphere, on which are representations of the celestial bodies;
  2. a center post affixed to said base and extending upwardly within the interior of said sphere;
  3. A representation of the sun affixed to said center post;
  4. a spherical segment element traversed by said center post and closely conforming to the bottom interior portion of said hollow sphere, said spherical segment element having a radially inwardly directed peripheral flange bearing calendar indicia;
  5. a primary support arm mounted for rotation about said center post;
  6. means for rotating said primary support arm about said center post;
  7. a gear mounted on a radial extension of said support arm for rotation about a vertical axis;
  8. a vertically upward shaft extension on said gear;
  9. first gear train means for rotating said gear from said center post as said primary support arm rotates about said center post;
  10. a wing plate secured to the top of said vertical shaft extension;
  11. an earth replica mounted on said wing plate for rotation about a north-south axis of the earth extending upwardly from said wing plate and spaced from said wing plate rotational axis;
  12. a double gear element journalled on said vertical shaft extension and having vertically spaced upper and lower gear members;
  13. a second gear train means driven from said center post for rotating said double gear element by engagement with said lower gear portion;

14. a third gear train means driven by the upper gear of said double gear element for rotating said earth replica about its said north-south axis;
15. a moon support having a replica of the moon affixed to one end and the other end being affixed to said double gear element; and
16. a circular cover plate secured to said primary support arm and cooperating with the peripheral flange of said spherical segment element to cover the said elements (5), (6), (7), (8), and (9), and (13) and being apertured to surround the central portion of said double gear element.

2. The combination defined in claim 1, wherein said wing plate has a depending peripheral flange housing the top gear portion of said double gear element and said third gear train means.

* * * * *